Sept. 23, 1947.  D. A. KORMAN  2,427,790
LIGHT BEAM COMPARATOR
Filed Jan. 10, 1945  3 Sheets-Sheet 2
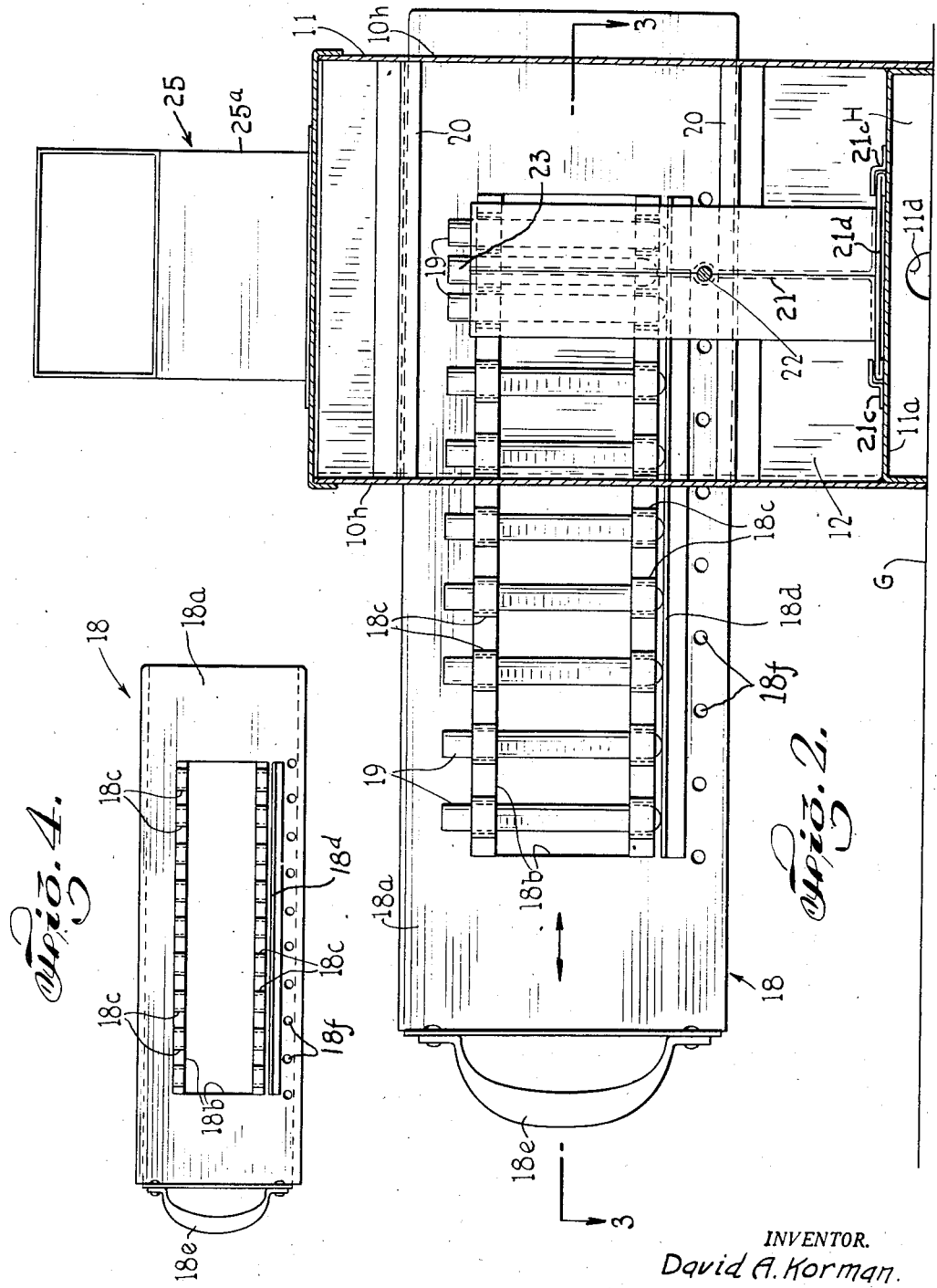
INVENTOR.
David A. Korman.
BY
Louis Barnett
ATTORNEY Sept. 23, 1947.                  D. A. KORMAN                    2,427,790
                              LIGHT BEAM COMPARATOR
                              Filed Jan. 10, 1945              3 Sheets-Sheet 3
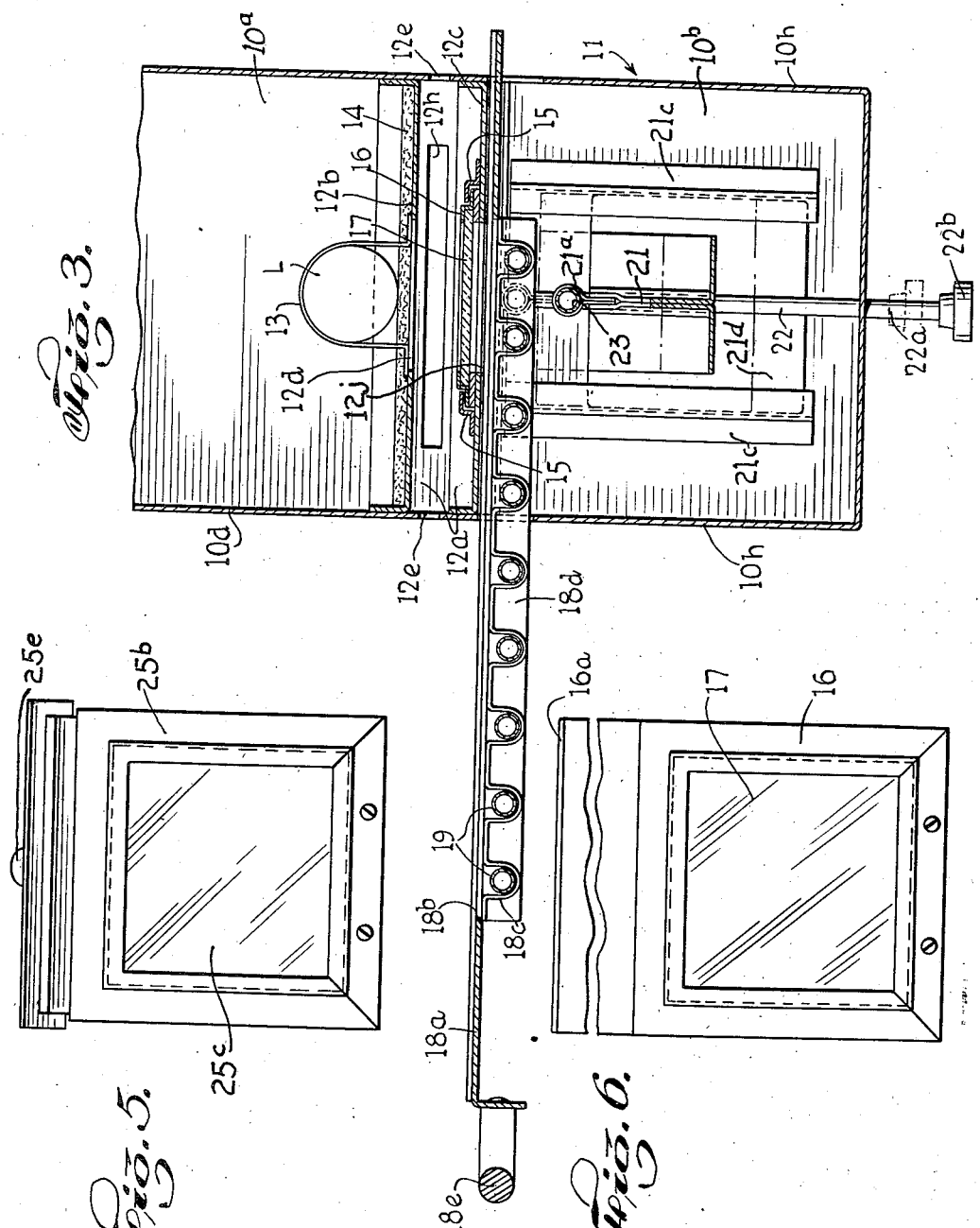
INVENTOR.
David A. Korman.
BY Louis Barnett
ATTORNEY Patented Sept. 23, 1947

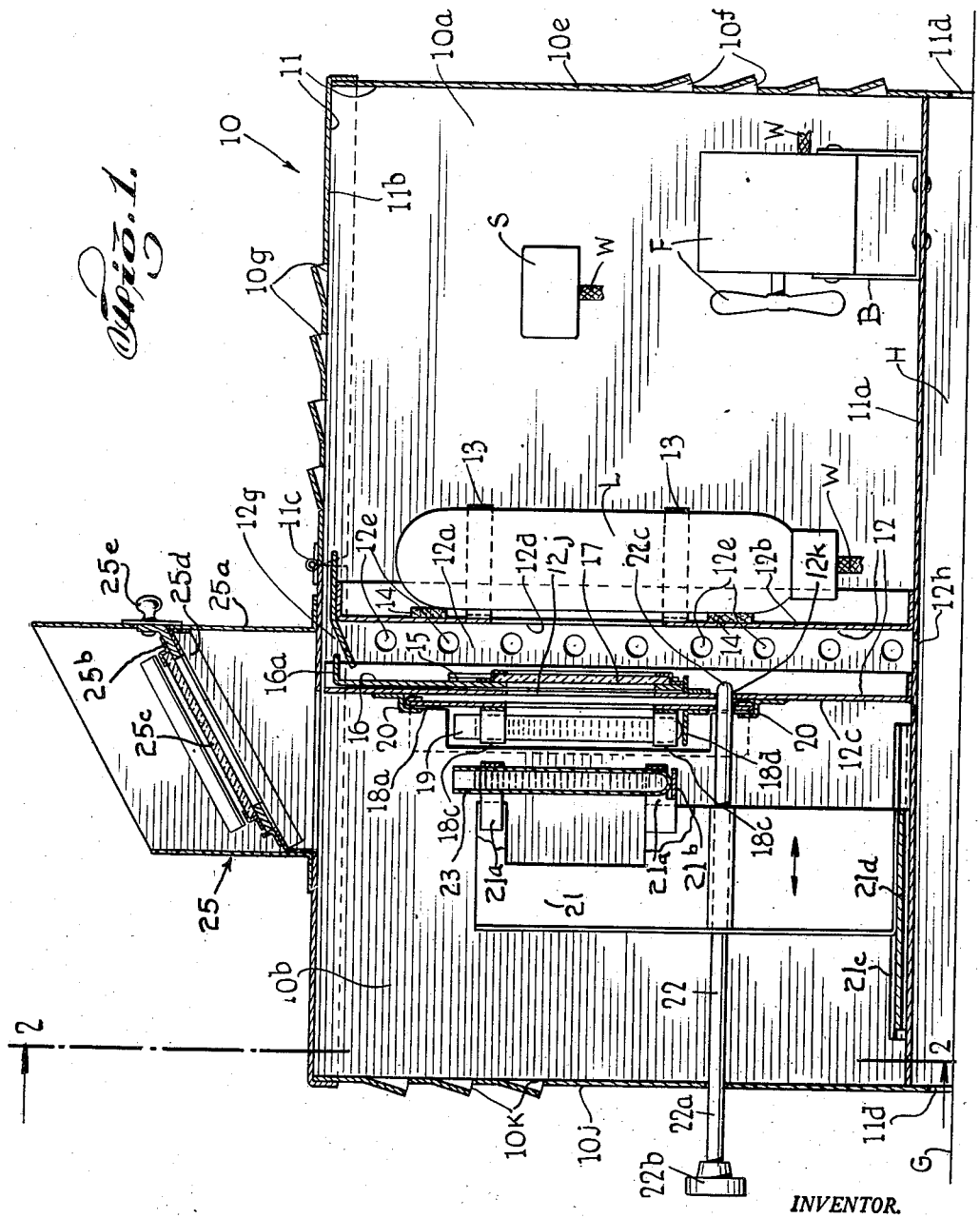

2,427,790

UNITED STATES PATENT OFFICE 2,427,790

LIGHT BEAM COMPARATOR

David A. Korman, Forest Hills, N. Y.

Application January 10, 1945, Serial No. 572,176

5 Claims. (Cl. 88—14)

This invention relates to testing and control apparatus for laboratories, research and plant installations, and more particularly is directed to fluorescent light beam comparators for assaying and measuring by comparison, the turbidity, color or fluorescence of solutions to determine the chemical and physical properties and characteristics thereof.

Among the objects of the invention is to provide an improved apparatus of the character described which shall comprise few and simple parts forming a neat appearing, compact instrument, which shall be relatively inexpensive to manufacture, which shall be capable of quickly and accurately determining or testing the chemical and physical properties of materials, which shall be easy and simple to manipulate, and which shall be practical and efficient to a high degree in use.

Other objects and advantages will in part be obvious and in part hereinafter pointed out.

The invention accordingly consists in features of construction, combination of elements, and arrangement of parts, which will be exemplified in the construction hereinafter disclosed the scope of the application of which will be indicated in the following claims.

In the accompanying drawing in which one embodiment of the invention is shown,

Fig. 1 is a side elevational view of an improved fluorescent comparator constructed to embody the invention shown partly in section to expose the interior assembly.

Fig. 2 is a front elevational view in section taken on line 2—2 in Fig. 1 showing the carrier rack in one extreme position.

Fig. 3 is a top sectional view taken on line 3—3 in Fig. 2.

Fig. 4 is a front elevational view of the carrier-rack removed from the apparatus.

Fig. 5 is a top plan view of the viewer filter and slide mounting therefor removed from the apparatus, and Fig. 6 is an elevational view of the lamp filter and slide mounting therefor removed from the apparatus.

Referring in detail to the drawing, 10 denotes a testing and control apparatus constructed to embody the invention in the form of a fluorescent-comparator suitable for assaying and measuring the physical and chemical properties or characteristics of solutions, such as relative turbidity, fluorescence or other colorimetric determination in assaying or measuring the characteristics of solutions, for example as required in water analyses, blood and urine chemistry, vitamin potency, hydrogen ionization, relative concentration, chemical constituents and for other like purposes.

Said apparatus 10 may be housed in a suitable casing 11 made of rigid sheet material, said casing 11 being divided into two main compartments or chambers 10a and 10b by a separating partition 12. The latter may be constructed with a conduit or flue 12a between walls 12b and 12c, and upstands from a midportion of the bottom side 11a of casing 11 as shown in Fig. 1. Partition wall 12b within chamber 10a has mounting means, such as bracket straps or bands 13, for securing a fluorescent type of lamp L over a centrally disposed window opening 12d, cushioning spacers 14 of asbestos being provided between said wall 12b and the lamp L. Said lamp L is thus firmly retained in position away from the surface of the wall 12b as shown in Fig. 1.

Chamber 10a also has mounted therein an electric motor-driven fan or blower F of any suitable construction which may be supported from the casing bottom side or floor 11a by a rigid angle support B. A switch S may be mounted on a side wall 10d of said chamber 10a for connecting into an electric circuit (not shown) the motor-driven fan F and lamp L in the well understood manner, fragmentary portions of the wiring of such circuit being shown at W in Fig. 1. A rear wall 10e of the chamber 10a adjacent the motor-driven fan F may be formed with inlet louvers 10f to admit air into the chamber 10a as a cooling medium about said fan motor and lamp L.

The flue 12a formed in the partition 12 may be made with spaced openings 12e which communicate with the exterior of casing 11 to serve as outlets for the circulating air forced by the fan F from the chamber 10a about the lamp L, through the partition wall window opening 12d into the flue 12a and out through said spaced openings 12e. A top cover or lid 11b is provided for casing 11 and extends over chamber 10a which extension may have suitable ventilating louvers 10g formed therein as shown in Fig. 1. A suitable hinge 11c may be provided for a section of the lid 11b so as to give access to the interior of chamber 10a without requiring the removal of the lid 11b.

The lower end of the flue 12a may be slitted as at 12h to provide another communication with the exterior of casing 11, the bottom side or floor 11a of the latter being positioned above a heat insulating space H over a supporting surface G for the apparatus 10 and through-openings 11d provided in the front and rear walls 10j and 10e, respectively of said apparatus as shown in Figs. 1 and 2.

The partition wall 12c also has a center window opening 12j which aligns with said window opening 12d so that light beams from lamp L pass therethrough. On the inner side of said wall 12c within the flue 12a and along vertical rim edges of said opening 12j runways 15 are secured in which is removably seated a filter frame holder 16 carrying a suitable light filter 17. Said holder 16 has a suitable finger grip means 16a for sliding said holder 16 with the filter 17 vertically into and out of effective position as is clear from Figs. 1 and 3.

In chamber 10b, on the other or front side of said partition wall 12c and extending horizontally above and below window opening 12j are secured runways 20 in which there is slidingly mounted a carrier-rack 18, the latter extending through both side walls 10h of chamber 10b for movement in a path in front of opening 12j as is indicated by the double arrow in Fig. 2. This opening 12j serves as an illuminated field of the light beams from the lamp L.

The carrier-rack 18 as seen in Figs. 1 to 4, may be made of an elongated stiff flat plate 18a having a central continuous open portion 18b, the latter being of a height equal to that of the partition wall window opening 12j. Suitable means, such as pairs of looped bracket members 18c extend horizontally along opposite rim borders of open portion 18b, said members 18c being made to have a plurality of uniformly spaced clear glass vessels or tubes 19 fitted therein. A bottom angle support 18d is provided to retain said tubes 19 in alignment, the mid-portions of said tubes 19 extending across the open portion 18b of plate 18a. A suitable handle 18e is provided at one end of plate 18a for effecting the sliding of carrier-rack 18 from the exterior of the casing.

Aligning centrally with window opening 12j within chamber 10b in front of the path of movement of carrier-rack 18, there is a carrier 21 having looped members 21a in which is fitted a single glass vessel or tube 23 vertically disposed to rest on ledge 21b. The carrier 21 with the tube 23 is mounted for movement to and away from said carrier-rack 18 as indicated by the double arrow in Fig. 1. As here shown, the carrier 21 may be smoothly reciprocated and retained firmly in effective positions by providing slide tracks 21c secured to the casing bottom 11a in which shoe portions 21d at the lower end of said carrier 21 ride. A horizontally extending guide rod 22, fixed to move with the carrier 21, projects through and beyond the front casing wall 10j as at 22a, the projecting end of the rod 22 terminating in a handle 22b for manipulating the carrier 21.

The guide rod 22 has a rear or leading end 22c extending to a point which is short of, that is, outside the path of carrier-rack 18 when said rod 22 with the carrier 21 is drawn to the extreme position toward the casing front wall 10j, said end 22c being adapted to be inserted through one of the spaced holes 18f of the carrier-rack 18 and also into an aligning hole 12k of the partition wall 12c when the carrier 21 is moved into an effective extreme position toward said carrier-rack 18. The tube 23 on carrier 21 then will be positioned between and in alignment with adjacent tubes 19 mounted on the carrier-rack 18. The front wall 10j of the casing 11 may be provided with suitable ventilating louvers 10k as shown in Fig. 1.

A viewer designated generally as 25 may be provided to upstand on the cover 11b directly over the open ends of the tubes 19 and 23 that are in the light field. Said viewer 25 has a tubular body portion 25a and may be provided with a suitable removable filter holder frame 25b carrying a filter 25c. The body portion 25a is secured on the casing cover 11b and has runways 25d formed therewith or mounted therein on which said holder frame 25b with the filter 25c is seated. The latter is slideably mounted in position preferably in angular relation to a horizontal plane, that is, to the direction of the path of light beams from the surfaces of the solutions at the open ends of said aligned tubes 19 and 23 to avoid possible glare. The filter holder frame 25b with the filter 25c may be removed by withdrawing the same from the seated position on runway 25d by means of handle 25e which extends through the body portion 25a as is clear from Fig. 1.

After constructing and assembling apparatus 10 as described above and shown in the drawing, the practical application of the invention will be apparent. The switch S of the electric wiring W is connected to a suitable power source to connect in circuit the motor-drive of fan F as well as the lamp L. The lamp L when used for fluorescent work may be of the mercury type and when requiring a relatively high wattage utilizes the motor-driven fan F to cool same by circulating air through chamber 10a, and the ventilating flue 12a.

Beams of light characteristic of the mercury lamp L will then pass through the window opening 12d across flue 12a and through filter 17 for absorbing all but a desired portion of the spectrum of said light beams. The filtered light beams passing through window opening 12j are available for illuminating the field in the path of movement of the tubes 19 carried on rack 18. If now one of the tubes 19 containing a standard or known solution be brought into the illuminated field by manipulating the handle 18e, the same can be readily used for comparison with a sample or test specimen solution contained in tube 23 mounted on carrier 21 which may also be positioned in said illuminated field beside tube 19 by manipulating handle 22b.

Now, through the viewer 25, with or without the filter holder frame 25b and filter 25c in effective position as is found necessary, a comparison of color characteristics or other differences in the solutions in tubes 19 and 23 can be made under the influence of light beams from lamp L, using the filter 17 if necessary said filter being readily removed if not required by sliding the filter holder frame 16 out of its seated position from the flue 12a in the casing 11, as is clear from Fig. 1. If desired the viewer 25 instead of being positioned as shown, may be mounted instead on the front wall of the casing in alignment with the partition wall window openings through which a comparison or determination of the desired characteristics of solutions in the several tubes can be made while said tubes occupy the illuminated field.

It is to be understood that apparatus 10 can be used by having a sample or samples of specimens of solutions contained in tubes 19 and a standard known solution in tube 23 for comparison in the manner above described.

It will thus be seen that there is provided an apparatus of the character described in which the several objects of this invention are achieved and which is adapted to meet the conditions of practical use.

As various other possible embodiments might be made of the above invention in which the type of light used may be varied as required, for example to protect the solution against undue heating, or to exclude certain spectrum rays, or for other reasons, and as various changes might be made in the embodiment set forth it is to be understood that all matter herein set forth and shown in the accompanying drawing is to be interpreted as illustrative and not in a limiting sense.

Having thus described my invention I claim as new and desire to secure by Letters Patent:

1. In an apparatus of the character described, a casing having an interior transversely extending partitioning means to provide adjoining compartments, said partitioning means formed with walls having aligned window openings, said walls being spaced apart to provide a flue extending between said compartments, said flue having outlets communicating with the exterior of the casing, an incandescent lamp serving as a light source occupying a first of said compartments, light beams from said lamp providing an illuminated field in said aligned window openings, pressure ventilating means positioned in said first compartment for supplying a cooling medium successively from said first compartment about said lamp and through said flue, a carrier-rack mounted for sliding movement on one of the partition walls within a second of said compartments along a path through said illuminated field, said carrier-rack extending through side casing walls of said second compartment for manipulating the sliding movement thereof from the exterior of the casing, vertically disposed open-ended tubes containing solutions uniformly spaced apart in alignment at least a distance equal to the width of each tube and removably secured on the carrier-rack, said tubes being laterally spaced so as to have a selected number of said tubes illuminated in said field, a carrier mounted for sliding movement on the bottom casing wall of said second compartment to and away from the partition wall window openings, a tube similar to each of said spaced apart tubes containing a solution removably secured on said carrier and moveable with the latter into said field between two of said spaced apart tubes in alignment therewith to permit comparison of the illuminated solutions in adjacent tubes with each other, said carrier having a portion extending through a front casing wall of said second compartment for manipulating the sliding movement thereof from the exterior of the casing, a wall of said second compartment having an opening aligned with said illuminated solution when positioned for comparison, and means carried by said wall for viewing adjoining tubes with the solutions illuminated in said field through said last mentioned opening from the exterior of said casing.

2. An apparatus as defined in claim 1 in which said viewing means includes a tubular body secured to a casing wall of the second compartment for observing all the illuminated tubes located within said field whereby a comparison thereof is facilitated.

3. An apparatus as defined in claim 1 in which said viewing means includes a tubular body secured to extend from the exterior casing wall of the second compartment to observe all the open ends of the tubes illuminated by said field whereby a comparison thereof is facilitated, said apparatus including a light filter slideably mounted on one of the partition walls within said flue to extend over the window opening thereof for modifying the effective character of said illuminated field.

4. An apparatus as defined in claim 1 in which a tubular body secured to extend from the exterior casing wall of the second compartment to observe the tubes illuminated in said field whereby a comparison thereof is facilitated, a light filter slideably mounted within said flue on the partition wall spaced from said lamp and extending over the window opening thereof for modifying the effective character of the illuminated field, and another light filter slideably mounted in the tubular body in an angular relation for observing the tubes in a non-glaring illumination of further modified effective character.

5. In an apparatus of the character described, a light source, a carrier-rack extending through an illuminated field of the light source, spaced tubes containing different solutions removably secured on the carrier-rack and positioned to be illuminated in said field, a carrier mounted for movement independent of the movement of said carrier-rack, a tube adapted to contain a solution removably secured on said carrier, means for moving said carrier to position the tube in said field between said spaced tubes to permit comparison of solutions in the various tubes with one another, a partition wall formed with a window opening of sufficient width to accommodate at least three tubes in alignment in which the illuminated field is located, means for supporting the carrier-rack for sliding movement with tubes along a path in and out of the field, a sliding support for the carrier movable along a path to and away from said partition wall and window opening, a light filter removably supported on said partition wall to extend over the window opening for modifying the effective character of said illuminated field, said tubes all being open ended and vertically disposed, a tubular viewing body positioned over the open ends of the tubes located in the field, and a second light filter removably supported in said tubular viewing body to modify the effective character of light beams passing therethrough.

DAVID A. KORMAN.

REFERENCES CITED

The following references are of record in the file of this patent:

UNITED STATES PATENTS

| Number | Name | Date |
|---|---|---|
| 1,675,967 | Zitkowski | July 3, 1928 |
| 2,045,124 | Cummins et al. | June 23, 1936 |
| 2,068,301 | Nagel | Jan. 19, 1937 |
| 2,193,437 | Summerson | Mar. 12, 1940 |
| 2,227,881 | Dooley | Jan. 7, 1941 |
| 2,341,810 | Peet | Feb. 15, 1944 |

FOREIGN PATENTS

| Number | Country | Date |
|---|---|---|
| 548,488 | France | Oct. 23, 1922 |
| 712,909 | France | Aug. 3, 1931 |

OTHER REFERENCES

"Nephelometry," by Kober et al., published Oct. 1915, page 3 cited. (Copy in Div. 7, U. S. Patent Office.)